UNITED STATES PATENT OFFICE 2,305,529

CYANOETHYLATED ARYL ACETONITRILES

William F. Hester, Drexel Hill, and Herman A. Bruson, Philadelphia, Pa., assignors to The Resinous Products & Chemical Company, Philadelphia, Pa., a corporation of Delaware No Drawing. Application May 1, 1941, Serial No. 391,350

9 Claims. (Cl. 260—464)

This invention deals with a method for introducing a β-cyanoethyl group into a compound of the formula

wherein Ar represents an aryl group and R represents hydrogen or a hydrocarbon group. This invention also relates to the polycyano compounds thus obtained.

It has been found that a compound of the above formula and acrylonitrile react in the presence of an alkaline condensing agent to replace with a β-cyanoethyl group the hydrogen on the carbon atom occurring between the aryl group and the nitrile group. If two hydrogen atoms are present, two β-cyanoethyl groups may be introduced to form a tri-cyano derivative.

Compounds having a reactive methylene or methenyl group between an aryl group and a nitrile group include such compounds as phenyl acetonitrile, o- and p-chlorophenyl acetonitrile, o- and p-bromophenyl acetonitrile, p-methoxyphenyl acetonitrile, p-methylphenyl acetonitrile, o-phenylphenyl acetonitrile, cyclohexylphenyl acetonitrile, α- and β-naphthyl acetonitrile, β-tetrahydronaphthyl acetonitrile, diphenyl acetonitrile, phenyl methyl acetonitrile, as well as other aryl acetonitriles having as nuclear substituents such neutral groups as halo, nitro, thiocyano, alkyl, aryl, aralkyl, cycloalkyl, alkoxy, aryloxy, benzyloxy, etc.

As an alkaline condensing agent for effecting the reaction there may be used any of the oxides, hydroxides, amides, hydrides, or alcoholates of the alkali metals, the alkali metals themselves, hydroxides of the alkaline earths, or strongly basic quaternary ammonium hydroxides. Typical of these agents are sodium and potassium hydroxide, sodium oxide, sodium amide, sodium methylate, potassium ethylate, barium hydroxide, benzyl trimethyl ammonium hydroxide, dibenzyl diethyl ammonium hydroxide, tetramethyl ammonium hydroxide, etc. The alkaline condensing agent may be employed in an inert suspending medium or in a solvent for the reactants, such as benzene, dioxane or ether, or in a medium which is less reactive to acrylonitrile than the aryl acetonitriles such as tertiary butanol or water.

In effecting the reaction the quantity of alkaline condensing agent required is small, amounts from 0.5% to 10% of the reactants usually being sufficient. The reaction occurs readily at temperatures below about 80° C., the range of 30° to 60° C. being preferred. In cases where considerable heat is given out at the start of the reaction, it is generally advisable to control the reaction by cooling as well as by gradual combination of the reactants. The reaction mixture may be purified in any of the usual ways, such as extraction, crystallization, distillation, etc. Before distillation, it is advisable to neutralize the mixture with acid to prevent decomposition during the distilling operation.

The invention is illustrated by the following typical examples.

Example 1

To a solution of 58.5 g. of phenylacetonitrile in 100 g. of dioxane, there was added 7 g. of an aqueous 40% solution of trimethyl benzyl ammonium hydroxide and the mixture was stirred and cooled while 53 g. of acrylonitrile was added dropwise during 40 minutes. The reaction temperature was 30–40° C. The mixture was then stirred for 20 hours at room temperature. The product was washed with water containing sufficient hydrochloric acid to neutralize the alkali and the heavy oil layer taken up in ethylene dichloride and washed thoroughly with water. Upon removing the ethylene dichloride by evaporation, there was obtained 108 g. of a dark, thick oil which was distilled in high vacuo. The product came over between 230° and 240° C. at 1 mm. pressure as a very pale yellow, thick oil which gradually crystallized on standing. After recrystallization from ethanol, it formed large colorless crystals, melting when pure at 70° C., the analysis of which agreed with di-(β-cyanoethyl)-phenyl acetonitrile:

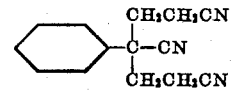

Example 2

To a solution consisting of 32.4 g. of p-nitrophenyl acetonitrile, 75 g. of dioxane and 2 g. of aqueous 38% trimethyl benzyl ammonium hydroxide there was added dropwise 21.2 g. of acrylonitrile while the reaction mixture was stirred and maintained at 34–37° C. by external cooling. After the addition, the mixture was stirred two hours longer at room temperature and then neutralized with dilute hydrochloric acid. Ethylene dichloride (100 cc.) was then added and the solution washed with water. The ethylene dichloride layer was separated and evaporated in vacuo on a steam bath. The residue consisted of 49 g. of crystalline product which, upon recrystallization from methanol, melted at 147–148° C., the analysis of which agreed with the formula

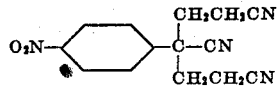

In the above examples the benzyl trimethyl ammonium hydroxide is typical of the more efficient catalysts and may be replaced with other strongly basic condensing agents with satisfactory results. The phenyl acetonitriles of the examples may be replaced with molar proportions of other aryl compounds which have a reactive methylene or methenyl group attached to the aryl group and to a nitrile group.

The products obtained have insecticidal value and are useful in the preparation of amides, esters, acids, amines, etc. which find use in resins, plasticizers, pharmaceuticals, insecticides, etc.

We claim:

1. A process of introducing a β-cyanoethyl group in place of a hydrogen atom on a carbon atom occurring in an aryl acetonitrile in which the said carbon atom is attached to an aryl group and to the nitrile group, which comprises reacting acrylonitrile and said aryl acetonitrile in the presence of an alkaline condensing agent.

2. A process of introducing a β-cyanoethyl group in place of a hydrogen atom on a carbon atom occurring in an aryl acetonitrile in which the said carbon atom is attached to an aryl group and to the nitrile group, which comprises reacting acrylonitrile and said aryl acetonitrile in the presence of a strongly basic quaternary ammonium hydroxide.

3. A process of introducing a β-cyanoethyl group in place of a hydrogen atom on a carbon atom occurring in an aryl acetonitrile in which the said carbon atom is attached to an aryl group and to the nitrile group, which comprises reacting acrylonitrile and said aryl acetonitrile in the presence of benzyl trimethyl ammonium hydroxide.

4. A process of introducing two β-cyanoethyl groups in the place of the hydrogen atoms of a methylene group connecting an aryl group and a nitrile group in an aryl acetonitrile, which comprises reacting at least two molecular proportions of acrylonitrile with a molecular proportion of said aryl acetonitrile in the presence of an alkaline condensing agent.

5. A process of introducing two β-cyanoethyl groups in the place of the hydrogen atoms of a methylene group connecting an aryl group and a nitrile group in an aryl acetonitrile, which comprises reacting at least two molecular proportions of acrylonitrile with a molecular proportion of said aryl acetonitrile in the presence of a strongly basic quaternary ammonium hydroxide.

6. The process of introducing a β-cyanoethyl group in place of a hydrogen atom on a carbon atom connecting a phenyl group and a nitrile group in a phenyl acetonitrile which comprises reacting acrylonitrile and a phenyl acetonitrile in the presence of an alkaline condensing agent.

7. As a new chemical compound, a polycyano compound in which two β-cyanoethyl groups are attached to a carbon atom connecting an aryl group and a nitrile group.

8. As a new chemical compound, di-(β-cyanoethyl)-phenyl acetonitrile, having the formula

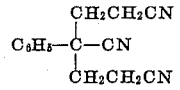

9. As a new chemical compound, di-(β-cyanoethyl)-p-nitrophenyl acetonitrile, having the formula

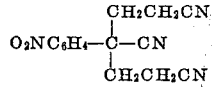

WILLIAM F. HESTER.
HERMAN A. BRUSON.